(12) United States Patent  (10) Patent No.: US 9,001,451 B1
Martin et al.  (45) Date of Patent: Apr. 7, 2015

(54) CLEARANCE DISTANCE VERIFICATION AND CONTROL

(71) Applicant: Seagate Technology LLC, Cupertino, CA (US)

(72) Inventors: Richard E. Martin, Longmont, CO (US); Quinn J. Haddock, Provo, UT (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/964,869

(22) Filed: Aug. 12, 2013

(51) Int. Cl.
G11B 21/02 (2006.01)
G11B 21/21 (2006.01)

(52) U.S. Cl.
CPC .................................... G11B 21/21 (2013.01)

(58) Field of Classification Search
None
See application file for complete search history.

(56) References Cited

U.S. PATENT DOCUMENTS

| | | | |
|---|---|---|---|
| 4,777,544 A | 10/1988 | Brown et al. | |
| 4,841,389 A | 6/1989 | Hoyt et al. | |
| 5,502,265 A | 3/1996 | Shveima | |
| 5,594,595 A | 1/1997 | Zhu | |
| 6,459,539 B1 | 10/2002 | Carlson et al. | |
| 6,735,027 B2 | 5/2004 | Helsel et al. | |
| 6,930,844 B2 | 8/2005 | Yeh et al. | |
| 7,046,463 B2 * | 5/2006 | Gay Sam et al. | 360/25 |
| 7,253,984 B1 * | 8/2007 | Patapoutian et al. | 360/75 |
| 7,310,194 B1 * | 12/2007 | Schardt et al. | 360/75 |
| 7,330,323 B1 * | 2/2008 | Singh et al. | 360/48 |
| 7,359,139 B1 | 4/2008 | Wu et al. | |
| 7,430,083 B2 | 9/2008 | Loh et al. | |
| 7,684,138 B2 | 3/2010 | Kitamura et al. | |
| 7,852,583 B2 * | 12/2010 | Uji et al. | 360/31 |
| 8,004,788 B2 | 8/2011 | Ehrlich et al. | |
| 8,154,820 B1 | 4/2012 | Madden et al. | |
| 8,315,007 B1 | 11/2012 | Sutardja et al. | |
| 8,320,069 B1 | 11/2012 | Knigge et al. | |
| 2013/0021690 A1 | 1/2013 | Xia et al. | |

* cited by examiner

*Primary Examiner* — K. Wong
(74) *Attorney, Agent, or Firm* — Hall Estill Attorneys at Law

(57) ABSTRACT

Method and apparatus for verifying and controlling a clearance distance of an object, such as but not limited to a fly height of a read/write transducer adjacent a recording medium in a data storage device. In accordance with some embodiments, a sensor is used to sense a plurality of patterns from an adjacent surface, with each pattern being written at a different constant frequency. A final clearance distance between the sensor and the surface is established in response to a multi-frequency response ratio from the sensor and a single frequency response ratio from the sensor.

20 Claims, 8 Drawing Sheets

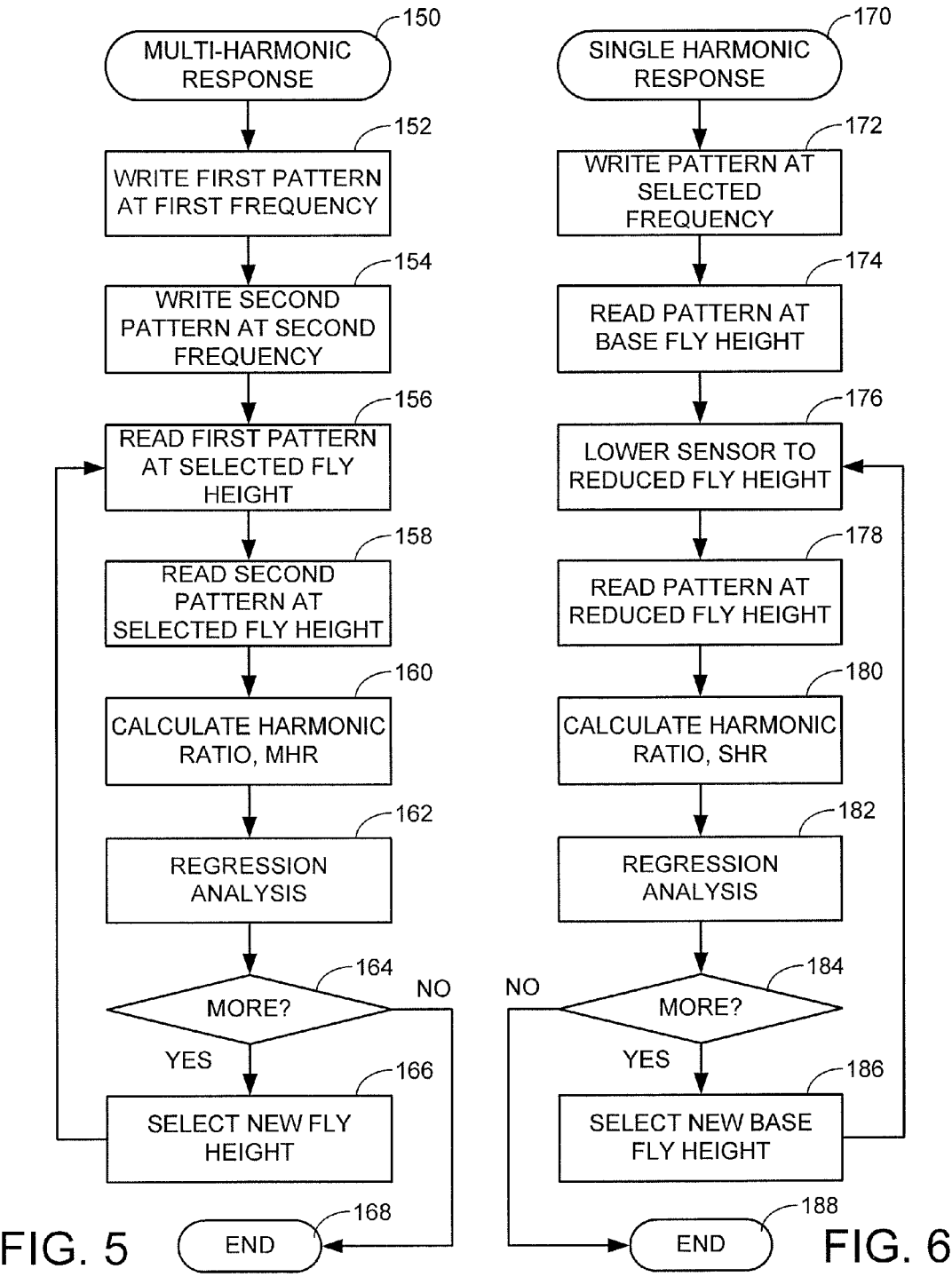

CLEARANCE DISTANCE VERIFICATION AND CONTROL

SUMMARY

Various embodiments of the present disclosure are generally directed to verifying and controlling a clearance distance of an object, such as but not limited to a fly height of a read/write transducer adjacent a recording medium in a data storage device.

In accordance with some embodiments, a sensor is used to sense a plurality of patterns from an adjacent surface, with each pattern being written at a different constant frequency. A final clearance distance between the sensor and the surface is established in response to a multi-frequency response ratio from the sensor and a single frequency response ratio from the sensor.

These and other features and aspects which characterize various embodiments of the present disclosure can be understood in view of the following detailed discussion and the accompanying drawings.

BRIEF DESCRIPTION OF THE DRAWINGS

FIG. 5 is a flow chart of steps carried out by the circuit of FIG. 4.

FIG. 6 is another flow chart of steps carried out by the circuit of FIG. 4.

DETAILED DESCRIPTION

Control systems can be used to move control objects from an initial position to a destination position, and to maintain the control object in a desired relation to another object. For example, hard disc drives (HDDs) often use servo control systems to position read/write transducers adjacent tracks on rotatable data recording media, and fly height control systems to control the clearance distances (fly heights) of the transducers above the associated media surfaces.

Successive generations of disc drives have been provided with decreased fly heights to support ever increasing gains in data storage capabilities. Fly heights of current generation products can be as low as a few Angstroms (Å). Because inadvertent contact between the transducers and the disc surfaces can lead to errors and damage, there is a continued need for improvements in the manner in which the fly height of a transducer is accurately sensed and controlled.

Accordingly, various embodiments of the present disclosure are generally directed to an apparatus and method for verifying a clearance distance between a controllably positionable object and an associated surface, such as a data read/write transducer and associated media surface in a data storage device. As explained below, a sensor is separated from a surface by a controllably adjustable clearance distance. A processing circuit is configured to set the clearance distance of the sensor to a selected value in response to a multi-frequency response ratio of the sensor and a single frequency response ratio of the sensor.

The sensor transduces a plurality of different patterns having different frequencies to provide the multi-frequency response ratio and the single frequency response ratio. The multi-frequency response ratio provides an absolute measure of the clearance distance, and the single frequency response ratio provides a relative measure of the clearance distance. The relative measure can be used to verify the accuracy, and associated confidence level, of the absolute measure. In this way, adjustments in clearance distance can be safely made without inadvertently inducing contact between the sensor and the surface. Effects that tend to change the fly height control system response, such as head degradation, electrical offsets, etc. can be detected and compensated.

Figure 1:
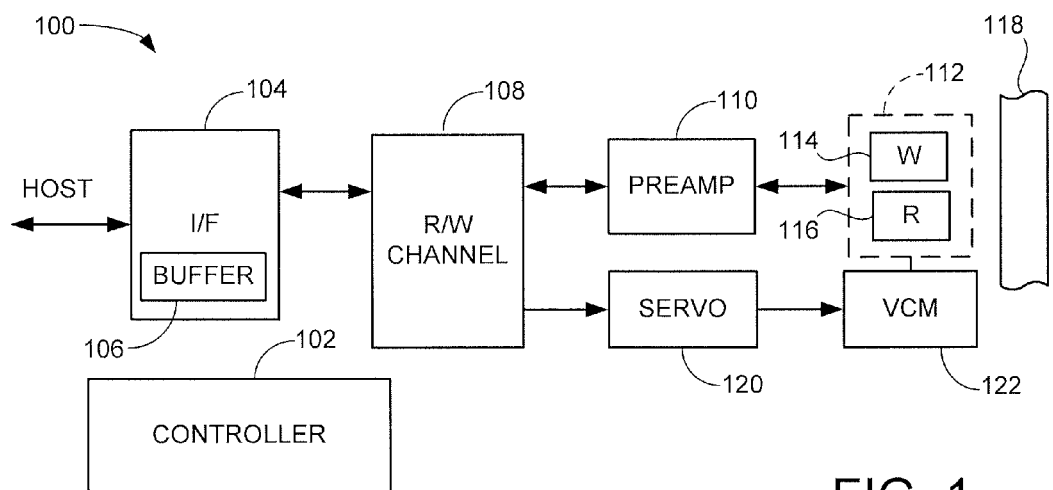
FIG. 1 is a functional block representation of a data storage device.

These and other features of various embodiments can be understood beginning with a review of FIG. 1 which provides a functional block representation of a data storage device 100. The device 100 is characterized as a hard disc drive (HDD) and is used to store and retrieve user data from a host device (not separately shown). The device 100 includes a top level controller 102, an interface circuit (I/F) 104 with a volatile memory data buffer 106, a read/write (R/W) channel 108, a preamplifier/driver (preamp) 110 and at least one data transducer (head) 112. At least the controller, interface and channel can be incorporated into one or more system on chip (SOC) integrated circuits.

The transducer 112 includes a write (W) element 114 and a read (R) element 116. These elements are respectively used to write data to and read data from a recording surface of a data recording medium 118 (e.g., a magnetic disc, etc.). A servo control circuit 120 provides current to a voice coil motor (VCM) 122 to position the respective read and write elements 114, 116 adjacent data tracks defined on the medium 118.

Figure 2:
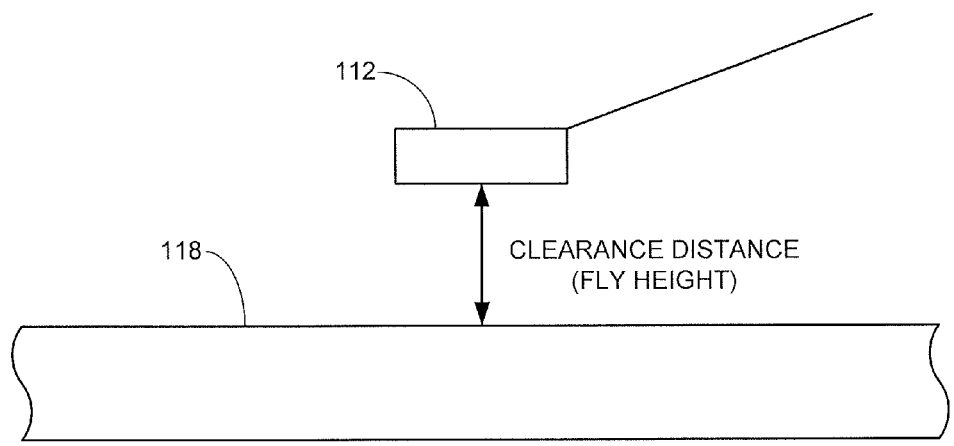
FIG. 2 shows a clearance distance of a transducer of FIG. 1.

The data transducer 112 is configured to be supported adjacent the medium 118 using fluidic (e.g., air) currents established by high speed rotation of the medium 118. This maintains the transducer 112 in a nominally stable, non-contacting relation at a selected clearance distance (fly height), as represented in FIG. 2.

Figure 3:
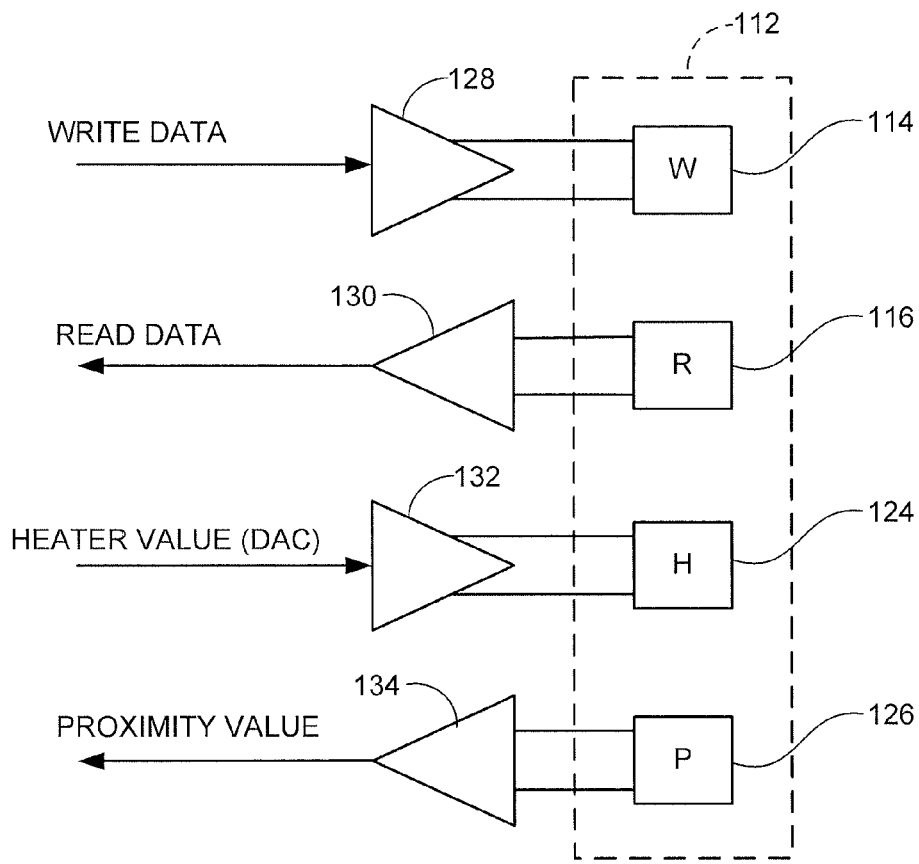
FIG. 3 shows control circuitry that interacts with the transducer.

The preamp 110 provides a number of operational functions including head selection, application of write currents during write operations, application of read bias currents and readback signal preconditioning during read operations, fly height adjustments, proximity sensing, etc. FIG. 3 shows relevant aspects of the preamp 110 in conjunction with the transducer 112.

The transducer 112 includes the aforementioned write and read elements 114, 116 as well as a heater (H) 124 and a proximity (P) sensor 126. Other transducer configurations can be used, including transducer configurations having multiple heaters, multiple proximity sensors, etc. In some embodiments, the write element 114 takes the form of an inductive coil writing element, such as a perpendicular magnetic recording head. The write element 114 can include heat assisted magnetic recording (HAMR) elements such as a light source, near field transducer (NFT), etc.

The read element (read sensor) 116 can take the form of a magneto-resistive (MR) magnetic sensor. The heater 124 is a type of clearance adjustment mechanism that adjusts the clearance distance between the read sensor 116 and the medium 118. The heater 124 can take the form of an electrically resistive block that induces changes in fly height responsive to thermal expansion of the transducer 112. The proximity sensor 126 can be a capacitive or electric field proximity sensor that indicates clearance distance using a proximity sense signal.

A write driver 128 of the preamp 110 provides a time varying, bi-directional pulse width modulated (PWM) write current to the write element 114 responsive to serialized write data supplied by the read/write channel 108 (FIG. 1). A preamplifier stage 130 of the preamp 110 applies preamplification and other signal conditioning to a readback signal obtained from the read element 116 during a read operation, and forwards the preconditioned signals for processing by the read/write channel 108.

A power driver 132 of the preamp 110 supplies voltage and/or current to the heater 124 responsive to an input heater value; the greater the heater value, the larger the amount of heat generated by the heater 124 and the lower the fly height of the transducer. The heater value can be supplied by the controller 102 or other aspects of the device 100. In some cases, a multi-bit digital value is supplied as a heater digital-to-analog (DAC) signal, with the driver 132 providing an output analog power level responsive to the magnitude of the input heater DAC signal.

A second preamplifier stage 134 of the preamp 110 amplifies and conditions proximity signals from the proximity sensor 126. The measured proximity value can be used by the controller 102 or other aspects of the device 100 as an indication of an existing fly height as part of a closed-loop clearance control operation.

Figure 4:
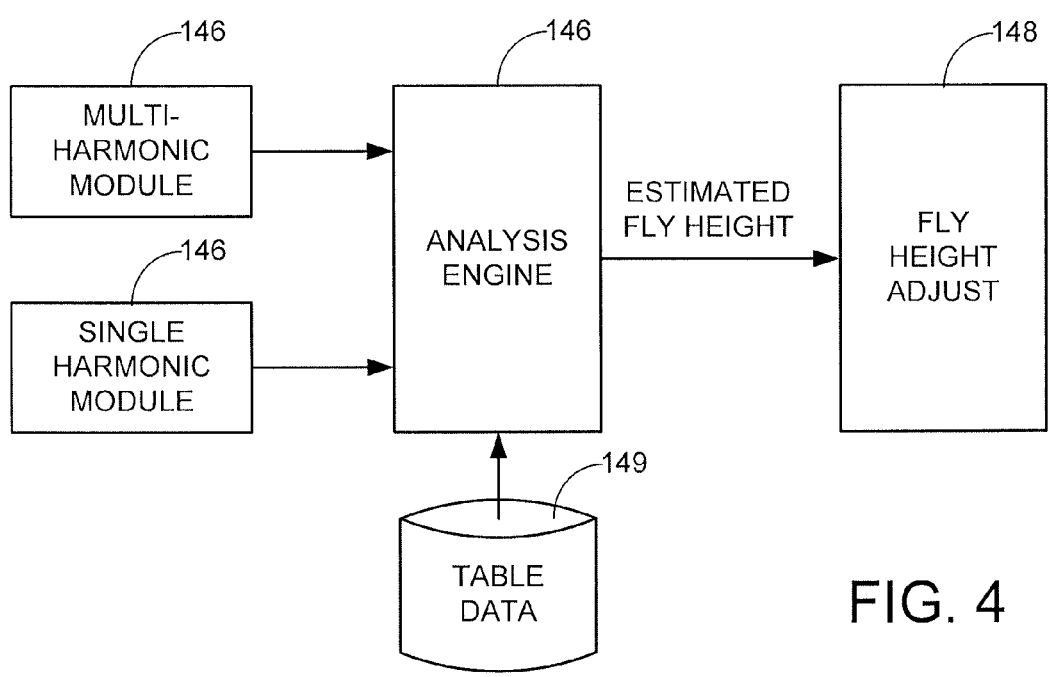
FIG. 4 is a functional block representation of a clearance distance verification and control circuit of the data storage device in accordance with some embodiments.

FIG. 4 illustrates a processing circuit 140 of the device 100. The processing circuit 140 can be embodied in one or more of the functional blocks represented in FIG. 1. As explained below, the processing circuit operates to detect an existing clearance distance (fly height) of the transducer 112 and, as required, to adjust the position thereof to a target clearance distance. The circuit 140 further operates to verify clearance distance measurements to ensure statistically significant values are obtained.

The circuit 140 can be activated at various times depending on the requirements of a given application. In some cases, manufacturing test data are obtained during device manufacture and stored, and the circuit 140 thereafter operates at suitable times during subsequent field use. The circuit 140 can be activated during device initialization, during periods of inactivity as a background calibration routine, at regularly scheduled times as part of a maintenance and reliability monitoring routine, in response to errors as part of an error recovery routine, etc.

The circuit 140 includes a multi-harmonic module 142, a single harmonic module 144, an analysis engine 146, and a fly height adjustment block 148. The respective modules 142, 144 perform different types of fly height measurements for a selected transducer 112 at suitable times during device operation. The analysis engine 146 uses the results of the modules 142, 144 to arrive at a statistically valid estimated fly height of the associated transducer. The analysis engine 146 may utilize data from a data structure, such as a look up table in a local memory 149, as part of the analysis processing. The fly height adjustment block 148 may adjust the fly height to a final (target) fly height in response to the estimated fly height, such as by lowering the fly height by increasing the amount of power supplied to the heater 124 (FIG. 3).

FIGS. 5-6 depict operational aspects of the multi-harmonic module 142 and the single harmonic module 144 of FIG. 4 in accordance with some embodiments. A multi-harmonic response routine 150 is carried out by the module 142 by measuring the harmonic response of the read sensor 116 (FIG. 3) from multiple test patterns written at different frequencies. The routine 150 provides an actual clearance distance value (actual ratio, or AR) indicative of the actual fly height distance from the sensor to the surface of the medium. It will be appreciated that the routine 150 is merely illustrative and that different steps, and different orderings of the steps, can be carried out as desired.

The routine 150 commences at step 152 by writing a first pattern to an appropriate location on the medium 118 at a first selected write frequency. The pattern may be a repeating (oscillating) pattern, such as a 2T pattern, and may be written to one or more tracks on the medium using the write element 114 and write driver 128 of FIG. 3. A second pattern at a different, second frequency is written at step 154. The second pattern may also be a repeating pattern, such as a 2T pattern, and is written using the write element and write driver to one or more tracks on the medium. It is contemplated, albeit not necessarily required, that the second frequency will be higher than the first frequency.

In some cases, one track will be written with the first pattern and an adjacent track will be written with the second pattern. The frequency patterns may be written to user data sector areas along the tracks normally used to store user data and between embedded servo fields. Any suitable frequencies can be used. A significant change between the frequencies, such as the second frequency being an order of magnitude (e.g., 10×) or more greater than the first frequency, can be suitable in some cases.

In other cases, a more generalized mixed test pattern can be written that has both high frequency and low frequency components which can be extracted from the readback signal. In still other cases, the servo amplitude can be used for one harmonic (such as the lower frequency) and a pure tone signal in the data fields can be used for the higher frequency. Other alternatives will readily occur to the skilled artisan in view of the present disclosure.

The first pattern is read at step 156 and the second pattern is read at step 158. This may involve servo position adjustments to respectively move the read sensor 116 over the different patterns. The patterns are read while maintaining the transducer 112 at a selected, common fly height above the medium 118. This may be a known safe clearance distance, which can be established by the heater input power value (heater DAC value or "Safe DAC" value) being at a known value to ensure clearance between the sensor and the medium surface. A passive fly height (e.g., no heater input) can be initially used.

The reading of the first pattern can provide a first sense signal and the reading of the second pattern can provide a second sense signal. Amplitude data associated with the sense (readback) signals obtained from the patterns are temporarily stored during these steps, such as in the local memory 149.

A multi-frequency harmonic ratio is calculated at step 160. The harmonic ratio MHR can be expressed as $$\text{MHR} = \ln(A_2/A_1) \tag{1}$$

where $A_2$ is the average amplitude of the readback signal obtained during the reading of the second pattern, $A_1$ is the average amplitude of the readback signal obtained during the reading of the first pattern, and $\ln(x)$ is a natural log function to provide linear proportionality to spacing. Other formulations for the harmonic ratio can be used. By dividing the respective amplitudes, gain changes and other electrical offsets can be eliminated from the measurement determination.

The resulting MHR value can be correlated to an actual clearance distance using calibration data previously obtained by the system (e.g., table data in FIG. 4). A calibration routine that establishes correlation between MHR values and actual clearance values will be discussed below in FIG. 7.

A regression analysis can be performed at step 162 as part of the clearance determination process. The regression analysis uses the MHR data points to provide a curve fit mathematical description of actual clearance distance versus heater input value within a certain confidence interval. The regression curve can be stored and subsequently referenced to set the clearance distance of the transducer. For example, if a clearance distance of 20 Angstroms (Å) is desired, the curve provides the corresponding heater DAC value that should be applied to the heater. Adjustments can be made for different environmental effects, such as ambient temperature, location, etc. Compensation values for these and other environmental effects can be empirically derived and stored.

A constrained piecewise second order least squares regression analysis is carried out in some embodiments. The second order term can be constrained in situations where this term tends to remain consistent over different operational environments, although such is not necessarily required.

Continuing with the flow of FIG. 5, additional MHR values can be obtained for other fly heights as desired, as shown by decision step 164 and selection step 166. If so, the fly height is lowered by increasing heater power (heater DAC) and the foregoing steps are repeated to obtain a new MHR value. The regression analysis is updated for each additional data point. The foregoing analyses can continue until a target clearance of the sensor from the medium is reached, after which the routine ends at step 168. Further considerations regarding statistical validity and use of the regression analysis will be set forth below.

Referring now to FIG. 6, the operation of the single harmonic module 144 (FIG. 4) is set forth by a single harmonic response routine 170. As before, the routine is merely illustrative and the various steps can be omitted or performed in a different order, and other steps can be incorporated into the routine. In some cases, both routines 150, 170 are combined into a single routine so that both multi-harmonic and single harmonic ratios are obtained during a single process.

Generally, the routine 170 uses a single frequency pattern which is detected at different fly heights to provide a single harmonic ratio (SHR) value. This can be used to identify a relative fly height, that is, an amount of change in clearance distance from one commanded fly height value to the next.

A pattern at a selected frequency, such as a 2T oscillating pattern, is written at step 172. One of the patterns written during the routine 150 of FIG. 5 can be used, or a new pattern can be written to the medium 118. The pattern is read using the read sensor 116 while the transducer is maintained at a first selected (base) fly height, as indicated by step 174. This can be characterized as a third sense (readback) signal. As before, amplitude information associated with the readback signal is temporarily stored during this step.

The sensor is next lowered to a reduced fly height at step 176. This can be carried out, for example, by increasing the applied power to the heater 124 (FIG. 3) by a selected increment. The pattern is read at the reduced height at step 178 to provide a fourth sense signal. Amplitude information is temporarily stored as before.

A single frequency harmonic ratio (SHR) is determined at step 180. The SHR value can be derived in a variety of ways, such as $$SHR = \ln(A_4/A_3) \tag{2}$$

where A4 is the amplitude from the sense signal obtained at step 178 and A3 is the amplitude from the sense signal obtained at step 174. As before, a natural logarithmic function can be used for linearity v. spacing, and other forms can be used. It is contemplated that A4 will be greater than A3 due to the closer proximity of the sensor to the pattern. Additional SHR values may be obtained at other clearance distances, as indicated by decision step 184 and selection step 186. A regression analysis on the resulting SHR values can be carried out at step 182. As before, a constrained piecewise second order least squares regression analysis can be used on multiple SHR values although such is not necessarily required. The foregoing analysis can continue until the routine ends at step 188.

The single harmonic response provides a nominal indication of how much change in clearance distance has occurred versus a given change in input power (or other input control parameter). The single harmonic response, also referred to herein as the HIRP (heater induced reduced protrusion) response, is less susceptible to certain types of environmental degradations, such as those that are frequency dependent, as compared to the actual measurement (AR) response of FIG. 5. For example, over time the read sensor 116 may encounter degradation of its high frequency response capabilities. Such degradations may be exhibited in the AR response but not in the HIRP response. By comparing the AR and HIRP responses, statistical validation of the actual clearance measurements can be obtained.

Figure 7:
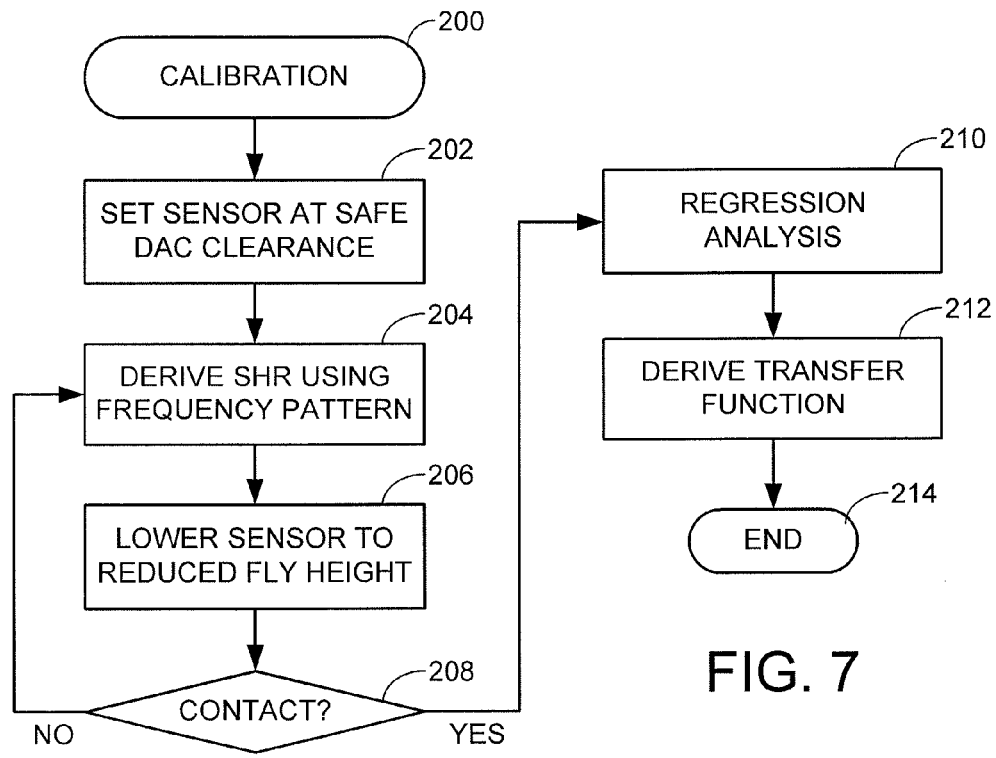
FIG. 7 is a flow chart for steps carried out by the circuit of FIG. 4 during an initial calibration routine.

FIG. 7 is a flow chart for a calibration routine 200 that can be used in conjunction with the routines of FIGS. 5-6. Generally, the calibration routine 200 uses the HIRP single harmonic response from FIG. 6 to calibrate the system. Successively higher heater DAC values are supplied to bring the sensor closer and closer to the medium surface until actual contact is detected. A transfer function is generated that relates clearance distance (fly height) to heater DAC and amplitude ratio to clearance distance. This transfer function is thereafter used to determine clearance distance from the MHR and SHR values in FIGS. 5-6. The routine 200 can be carried out during device manufacture and at appropriate times during field use.

As shown in FIG. 7, the process begins by setting the sensor to a safe clearance distance (Safe DAC), which is a clearance that is substantially known to be relatively far away from the surface. A condition where little or substantially no power is applied to the heater can constitute this initial Safe DAC value. Other values can be used, including moderate heater DAC values known from empirical analysis to be a safe (non-contacting) level.

A single harmonic ratio (SHR) value is derived at step 204 using a single frequency pattern while the sensor is maintained at the safe clearance distance of step 202. The sensor is incrementally lowered at step 206, such as by increasing the power level to the heater 124 (FIG. 3).

Decision step 208 determines whether contact is detected between the transducer 112 and the medium 118 at this new lowered fly height. Contact detection can be carried out in a variety of ways, such as from the proximity sensor 126 (FIG. 3) or by detecting a thermal asperity event using the read sensor 116.

If no contact is detected, the foregoing steps are repeated with a new SHR value obtained each time. This provides a succession of SHR values and associated heater DAC input values as the head is lowered farther and farther until contact is established with the medium. Once contact is detected, the routine passes to step 210 where a regression analysis is applied to the SHR values as discussed above using the known contact point as an absolute reference (e.g., zero clearance distance). A transfer function is derived at step 212 that relates clearance distance to the heater DAC values and the amplitude ratios to clearance distance. The values are stored in memory (e.g., local memory 149) and the routine ends at step 214.

For clarity, the regression analysis of FIG. 7 can be carried out on both MHR and SHR based spacing values simultaneously and can be used together to predict the new dac to target distance.

Figure 8:
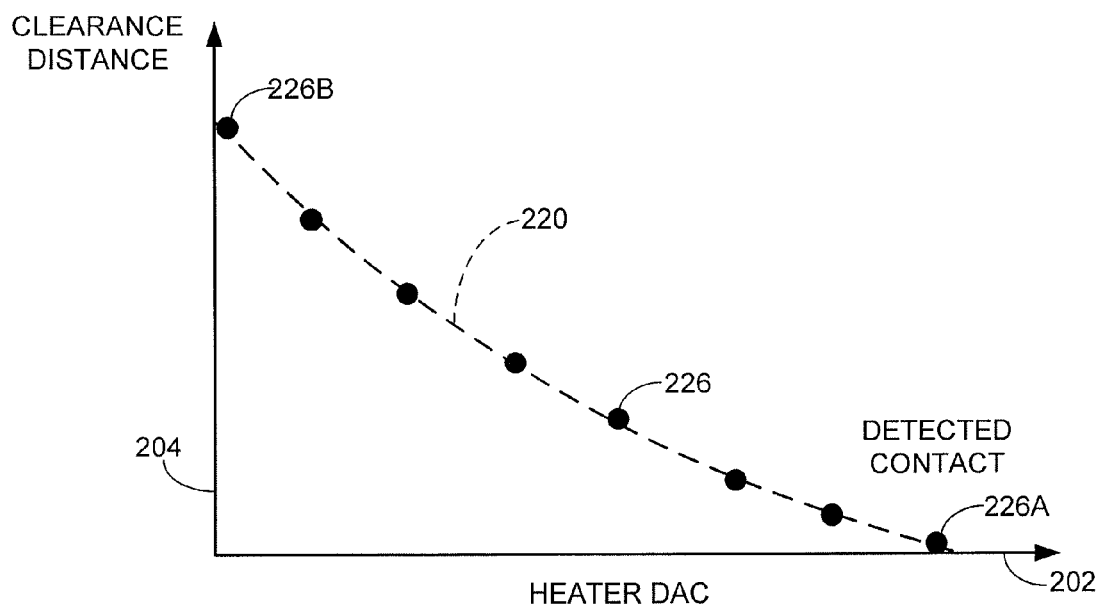
FIG. 8 shows data obtained from the flow chart of FIG. 7.

FIG. 8 graphically depicts an example regression curve 220 obtained by the routine 200 of FIG. 7. The regression curve 220 is plotted against a heater DAC x-axis 202 and a clearance distance y-axis 204. SHR values are represented by points 226. The individual SHR values can be obtained by successively incrementing the heater DAC value in relatively small increments to bring the sensor closer and closer to the medium surface until contact is detected (point 226A). Although the single harmonic response is normally a relative measure, an accurate estimate of actual clearance levels can be obtained using the zero clearance point 226A as a reference. In this way, an accurate estimate of clearance distance can be obtained for any point along the curve up to the initial Safe DAC clearance (point 226B).

A feature of the calibration routine of FIG. 7 is that, under selected conditions (e.g., ambient temperature, etc.), the heater power level (e.g., input DAC value to heater driver 132 in FIG. 3) necessary to induce head-disc contact is known, and the profile (regression curve 220) allows an estimated clearance distance to be calculated for lower heater power levels less than that which induces contact. While the calibration routine uses the HIRP response of FIG. 6, other calibration methods can be used, including the use of AR measurements (e.g., multi-harmonic ratio) that are driven to disc contact. FIGS. 7-8 use the the HIRP response (single harmonic ratio), however, since the HIRP measurements have been found to be less susceptible to frequency dependent variables.

Once successfully calibrated as discussed in FIGS. 7-8, the processing circuit 140 of FIG. 4 provides the device 100 with a measurement system in which the relationship between the two measurement methodologies (AR and HIRP) is rendered mathematically. Because the respective measurements are susceptible to different types and sources of reader degradation, the presence of such degradations in a given system will tend to be exhibited as a divergence between the measurement results. Close correspondence between the AR and HIRP responses improves the likelihood that the AR response represents the actual clearance distance of the transducer 112.

Figure 9:
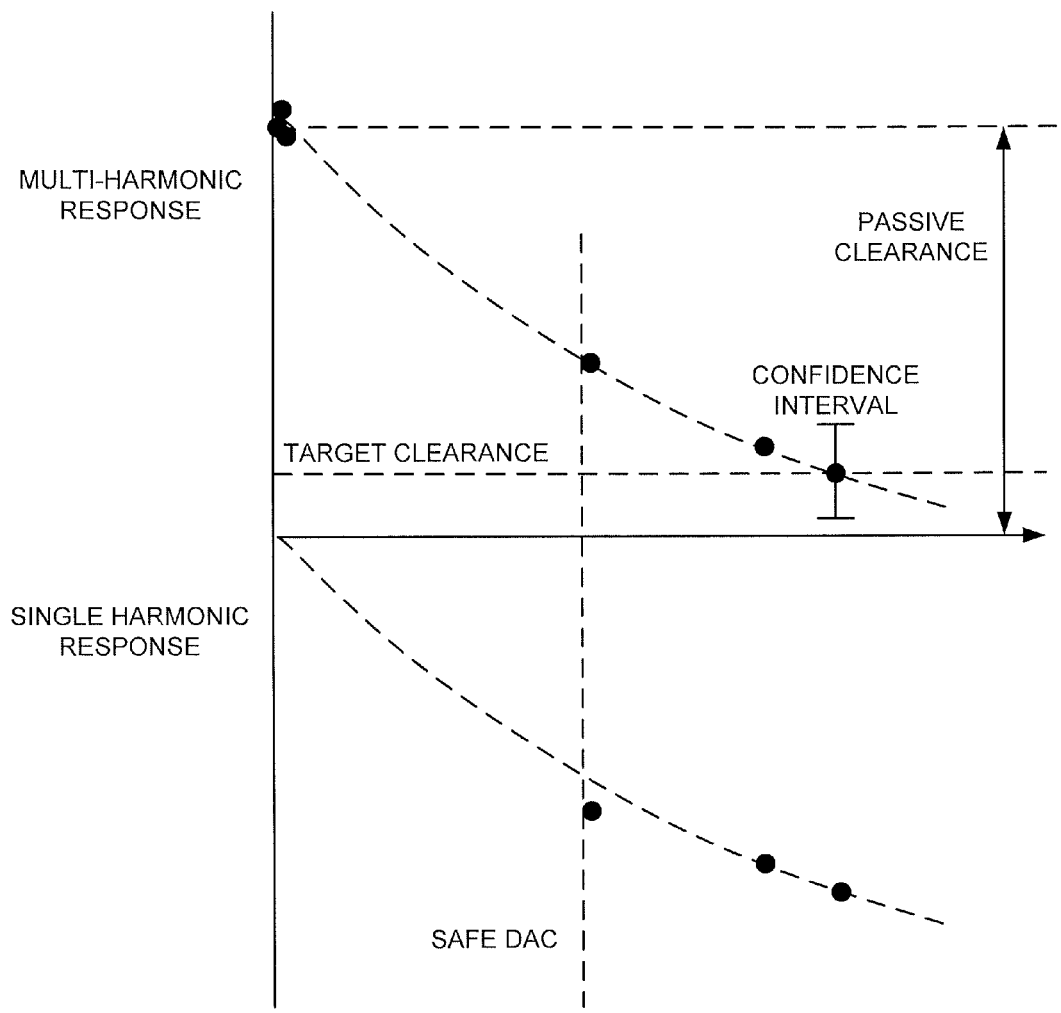
FIG. 9 shows data obtained from the flow charts of FIGS. 5-6.

FIG. 9 illustrates a pair of regression curves 230, 232 plotted against a reference x-axis 234 and a common amplitude y-axis 236. The regression curve 230 ("AR curve" or "actual clearance distance regression curve") is obtained by performing a first regression upon the MHR values (represented by points 238) from FIG. 5. The regression curve 232 ("HIRP curve" or "relative clearance distance regression curve") is obtained by performing regression analysis upon the SHR values (points 240) from FIG. 6. Generally, it is contemplated that the two independently derived curves 230, 232 will have substantially similar shapes, within a selected tolerance range. The y-intercept of the HIRP curve 232 is constrained at zero.

For clarity, it will be noted that the respective regressions can be expressed, stored and used in a variety of ways, including the calculation and storing in memory of various coefficients sufficient to enable the processing circuit 140 to provide an output estimated clearance distance for any given input heater DAC value. It will be appreciated that the regression curves need not actually be "plotted" or "displayed" in order to be generated, derived and/or used. In some cases, the curves are stored as parameters of a second order constrained model in the local memory 149.

A verified Safe DAC value is represented by line 242. This represents a moderate power level for the heater 124 (FIG. 3) that is known empirically to not result in head-disc contact. A passive clearance (line 243) represents fly height of the transducer 112 at a zero power level to the heater 124. Initial MHR values (points 238) can be derived beginning at this clearance distance. The SHR values (points 240) begin at the Safe DAC value due to the zero y-intercept constraint applied to the HIRP curve 232, although such is not necessarily required.

A target clearance is represented by line 244. This represents a final desired clearance for the transducer. A target clearance value might be, for example, on the order of about 15 Angstroms (15 Å). Other suitable values can be used.

In some embodiments, the MHR and SHR values and associated regression analyses are concurrently generated, with the respective regression analyses updated with each new set of MHR and SHR points. The routines of FIGS. 5 and 6 can be executed concurrently to obtain successive AR and HIRP amplitude ratios, and the analysis engine 146 (FIG. 4) can update both regression analyses on an ongoing basis. Substantial conformance between the curves 230, 232 verifies the validity of the actual clearance measurements of the multi-harmonic response.

In some cases, a confidence interval can be calculated for each regression curve 230, 232 using known mean square error techniques. For example and not by way of limitation, a confidence interval for the curve 230 is represented by range bar 246. This means that there is a selected confidence level, such as 95%, 99%, 99.95%, etc. that for a given input heater DAC value the actual clearance distance will be within the range denoted by the bar 246. Calculation of confidence intervals will be discussed in greater detail below.

The regression analysis continues with successively lower commanded fly heights until the target clearance level is reached and the single sided confidence interval is less than the target clearance level. To illustrate this, assume that the target clearance 244 is a clearance distance from the transducer 112 to the medium 118 of 15 Å. The overall length of the confidence interval range bar 246 is 20 Å, so that the single sided confidence interval is 10 Å. Another way of expressing this is that the AR regression analysis at point 238A indicates that a clearance distance of 15 Å±10 Å is achieved at this particular heater DAC input value. It is desirable that the single sided confidence interval (e.g., 10 Å) be less than the target clearance (e.g., 15 Å) to ensure non-contact with the medium 118.

Figure 10:
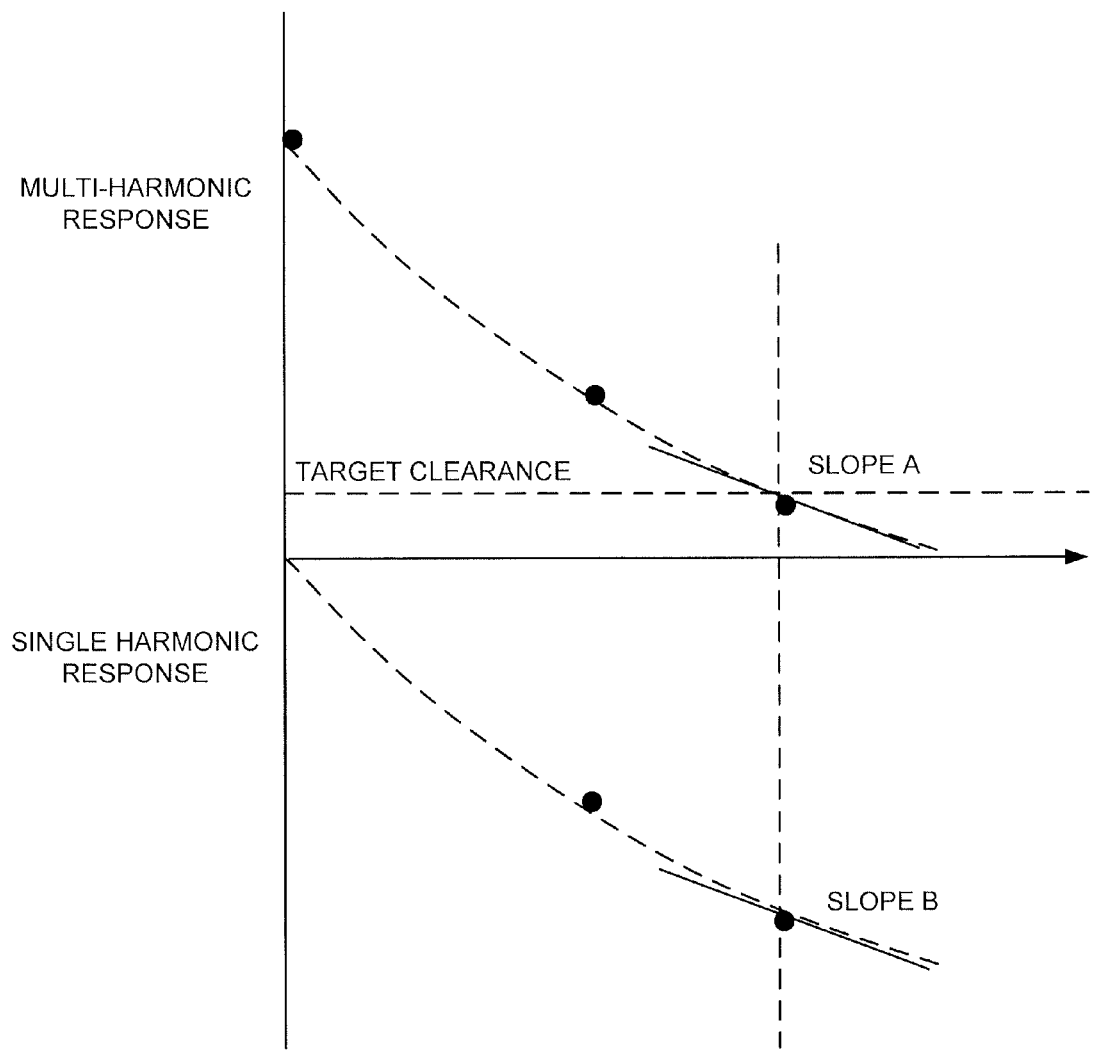
FIG. 10 shows other data obtained from the flow charts of FIGS. 5-6.

FIG. 10 shows another set of AR and HIRP regression curves 250, 252 obtained as set forth above. MHR and SHR points are denoted at 254 and 256, respectively. A target clearance distance is indicated by line 258.

Slope lines 260, 262 are determined for the respective curves 250, 252 at the target clearance distance. The slope lines 260, 262, having respective slopes of Slope A and Slope B, represent the tangential lines that intersect the curves 250, 252 at the target clearance 258. Slope A is at a nominal angle of $\theta_A$ and Slope B is at a nominal angle of $\theta_B$. It can be seen that the slope lines 260, 262 are substantially parallel (e.g., $\theta_A$-$\theta_B$). This provides mathematical verification of the statistical validity of the MHR regression. More generally, the HIRP response can be used to validate the AR response if:

$$|\theta_A - \theta_B| < T_S \quad (3)$$

where $T_S$ is a selected threshold. Other forms of similarity measurements can be used to compare the respective regression analysis curves 250, 252 and such forms will readily occur to the skilled artisan in view of the present disclosure.

Figure 11:
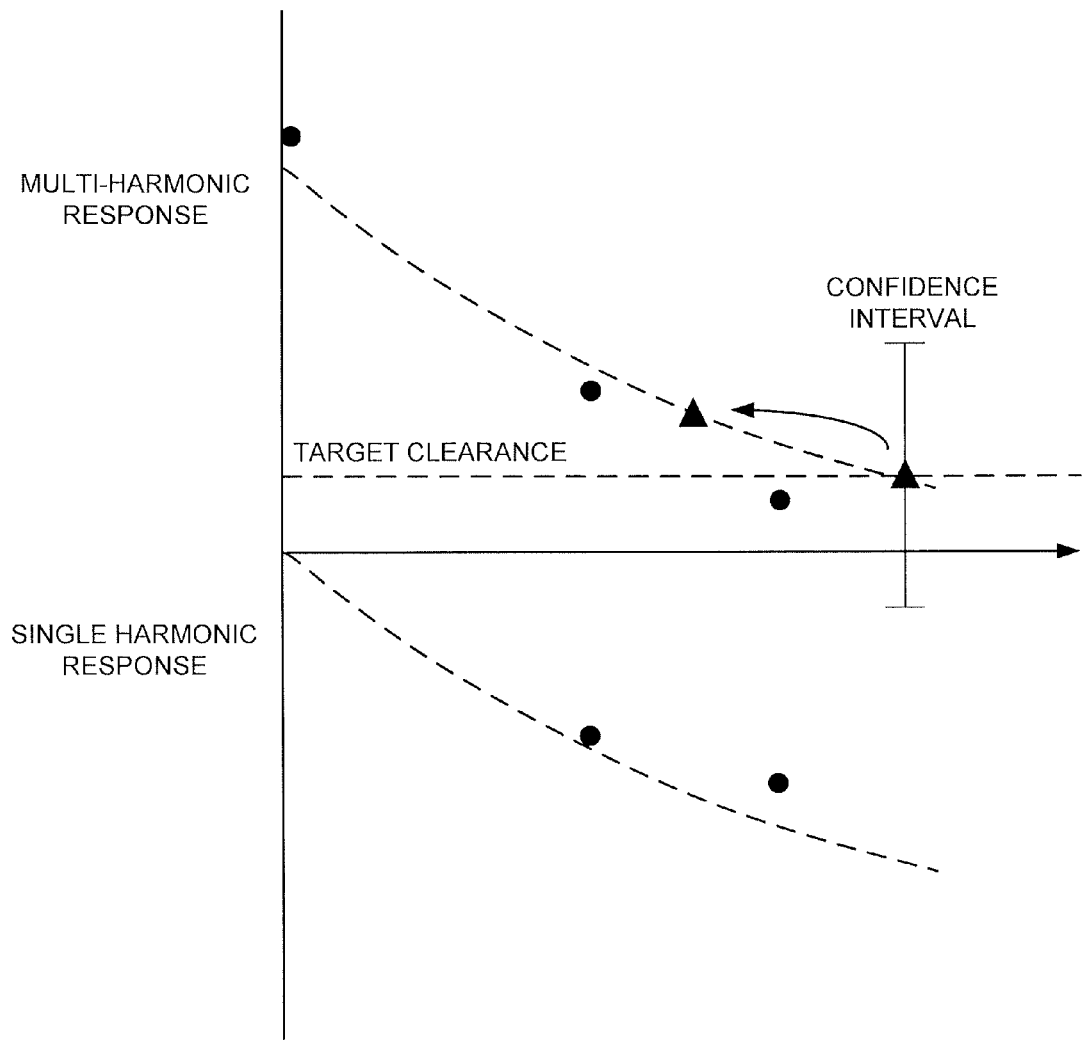
FIG. 11 shows other data obtained from the flow charts of FIGS. 5-6.

FIG. 11 illustrates another set of AR and HIRP regression curves 270, 272 obtained as set forth above. MHR and SHR points are denoted at 274 and 276, respectively. A target clearance distance is indicated by line 278. A confidence interval is indicated by range bar 280.

Unlike FIG. 9 which provided a relatively small confidence interval, FIG. 11 provides a relatively large confidence interval at the target clearance. This is due in part to noisy results in the amplitude ratio measurements. For example, the target clearance in FIG. 11 may be 15 Å, but the confidence interval may be on the order of about 40 Å (e.g., the target clearance is estimated at 15 Å±20 Å).

When the MHR and SHR measurements are of relatively poor quality as represented in FIG. 11, the confidence interval will increase and the uncertainty in the clearance distance will be large. If measurements continue to be made at the next lower fly height (heater DAC increment), there will be a non-insignificant probability that transducer-medium contact may occur since it cannot be safely determined that the next increase in heater input value will not induce a contact event. It does no good to conclude that, for a given heater power input, the transducer 112 will be at a clearance of 15 Å if the uncertainty range is ±20 Å.

If the single sided confidence interval is greater than the target clearance as depicted in FIG. 11, the next measurement can be carried out at the prediction interval rather than the target interval. As shown in FIG. 11, instead of obtaining an MHR measurement at the clearance distance of 15 Å (denoted by open triangular marker 274A), the next MHR measurement is made at a heater input value that nominally corresponds to the single sided confidence level of 20 Å (denoted by solid triangular marker 274B). In this way, the likelihood of a contact event can be reduced. This can be generally expressed as:

$$TC-SSCI>0 \quad (4)$$

where TC is the target clearance at any given point (e.g., 15 Å in FIGS. 9 and 11) and SSCI is the single sided confidence interval at that same point (e.g., 10 Å in FIG. 9; 20 Å in FIG. 11).

It follows that both mathematical similarity between the respective AR and HIRP curves and sufficiently low confidence intervals can be used by the processing circuit 140 of FIG. 4 to validate the actual clearance distance measurements of the AR regression analysis. If both conditions are met, the system can proceed to safely command selected fly heights based on the AR regression curve.

On the other hand, if the respective AR and HIRP regression curves are not sufficiently similar such as through the foregoing slope analysis of equation (3), and/or the confidence interval cannot be made to converge to satisfy equation (4) after multiple attempts, an error condition may be declared. Such error condition will indicate that the actual clearance distances using the AR response are suspect and should not be relied upon. Corrective actions can be taken using other mechanisms to detect and control fly height, such as through the use of the proximity sensors 126 of FIG. 3.

If the characteristic noise in the system indicates a persistent failure, such as the commencement of high frequency response loss by the transducer 112, other corrective actions may take place as well such as deactivation of the head, indication to system personnel of a pending drive failure to allow device replacement, etc.

The regression analysis performed by some embodiments will now be described in greater detail. Under the fixed second order term and zero HIRP intercept constraints listed above, the AR reader clearance distance "R" and the HIRP reader clearance distance "h" can take the form:

$$R = c_2 \delta^2 + c_1 \delta + c_0$$

$$-h = c_2 \delta^2 + c_1 \delta \quad (5)$$

where $\delta$ is the adjusted heater DAC scale value and $c_0$, $c_1$ and $c_2$ are constants. The adjusted heater DAC scale is constrained where all values are greater than zero and are modified by a constant offset associated with the electrical response of the system. The second order constant $c_2$ is known, and the intercept constant $c_0$ is equal to the passive clearance distance (see FIG. 9). Straightforward matrix multiplications can be used to incorporate the various AR and HIRP measurements, which can be carried out at common heater DAC input values as discussed above.

Writer clearance "W" can be expressed as:

$$W = R - h(\gamma - 1) \quad (6)$$

where $\gamma$ is an offset value. Combining equations (5) and (6) provides:

$$W = (c_2 \delta^2 + c_1 \delta)\gamma + c_0 \quad (7)$$

which can be solved for a heater DAC value $\delta_T$ that achieves the target clearance interval T (e.g., line 244 in FIG. 9) as $$\delta_T = \frac{-\gamma c_1 - \sqrt{\gamma^2 c_1^2 - 4\gamma c_2 (c_0 - T)}}{2\gamma c_2} \quad (8)$$

For a given target clearance heater DAC value $\delta_T$, two quality metrics can be applied to judge the quality of the $\delta_T$ estimate: the first is the 95% (or some other) confidence interval on the close point clearance at $\delta_T$, and the second is the local HIRP slope (Slope B) at $\delta_T$. Confidence level can be based on known mean square error (MSE) calculation techniques. Slope of the HIRP regression curve at the target clearance is generally stable and repeatable, and can be evaluated as described above or using a relation such as $$h'_T = -2c_2 \delta_T - c_1 \quad (9)$$

where $h'_T$ is the slope at the target clearance corresponding to heater DAC value $\delta_T$. In some cases, a tighter confidence interval, such as 99%, can be used to ensure safe operation at a lower confidence interval, such as 95%, when accounting for other environmental factors.

Figure 12:
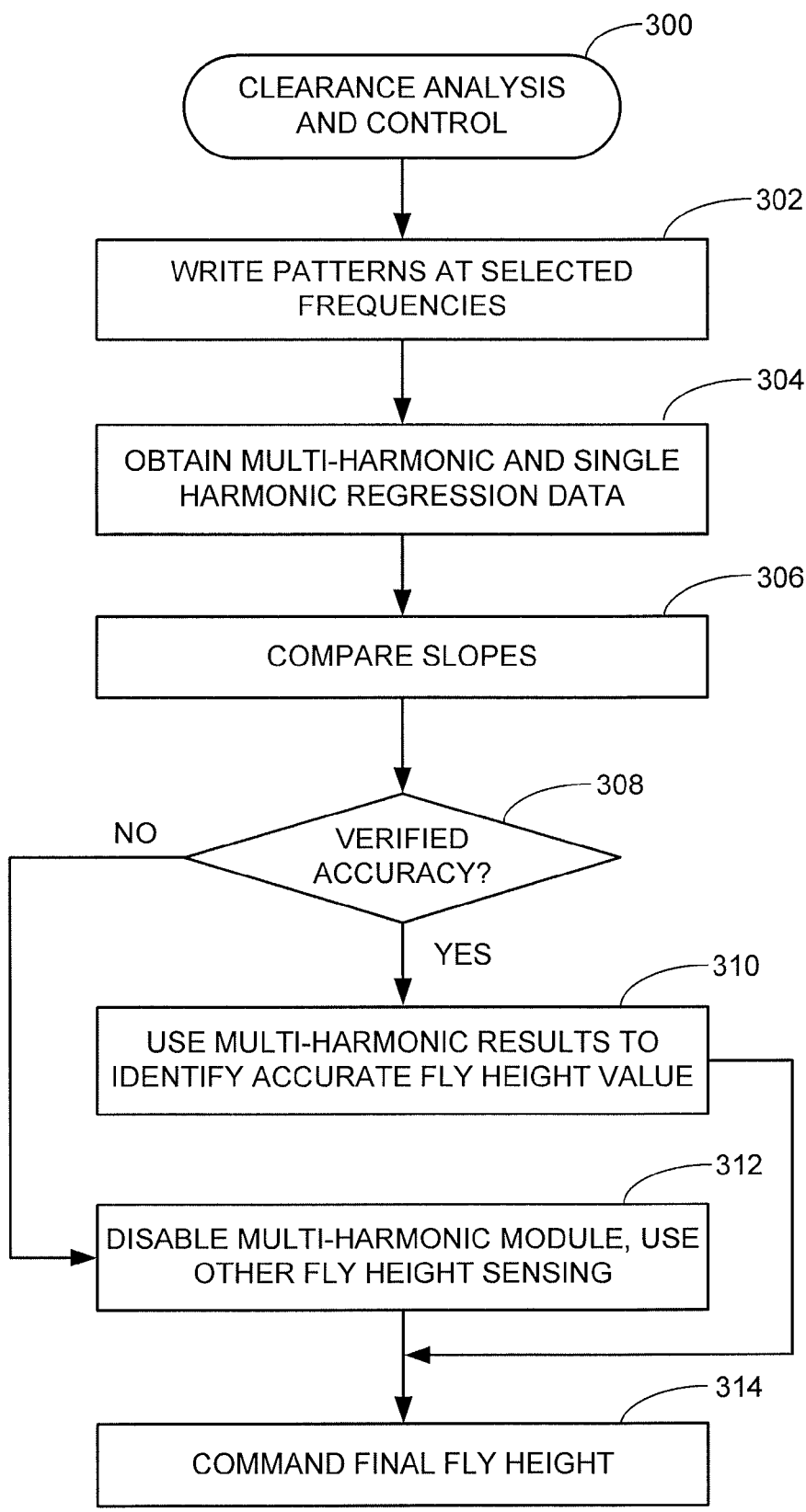
FIG. 12 is another flow chart of steps carried out by the circuit of FIG. 4.

FIG. 12 provides a flow chart for a clearance analysis and control routine 300 which summarizes the foregoing discussion. The routine may be carried out by the circuit 140 in FIG. 4 at suitable times to verify and adjust the fly height of transducers 112 in the device 100. The routine can be performed for each transducer in turn.

A plurality of frequency patterns are written to the medium 118 at step 302. This can include a first pattern at a first frequency, a second pattern at a different, second frequency and a third pattern at a different, third frequency. The first two patterns are used for the AR measurements and the third is used for the HIRP measurement. In some cases, two patterns at different frequencies are written for use by the AR measurements and one of the two patterns is used for the HIRP measurements.

Step 304 generates multi-harmonic (AR) ratios and performs an associated regression analysis thereon, and generates corresponding single harmonic (HIRP) ratios and performs an associated regression analysis thereon. These operations are discussed above in FIGS. 5 and 6. A verification step is performed at step 306 to compare the respective slopes of the resulting regression curves and to ensure the single sided confidence interval is less than the target clearance. Other similarity measures between the respective regressions can be used.

If the results from the verification step are confirmed, decision step 308, the flow passes to step 310 where the multi-harmonic (AR) regression data are used as an accurate indication of actual clearance distance versus input DAC heater values. The existing heater DAC value thus indicates the current fly height.

If the results from the verification step are not confirmed, corrective actions may be taken such as obtaining additional data points to improve the regression accuracy. If the errors cannot be satisfactorily resolved, the flow passes to step 312 where the multi-harmonic module is disabled and no longer relied on for that transducer to indicate actual clearance distances. Other fly height sensing mechanisms can be employed at this time, such as the use of proximity sensors 126 (FIG. 3). The processing circuit 140 may set an error flag in a memory location (e.g., memory 149 in FIG. 4) to identify a detected error associated with the read sensor 116.

Finally, as desired a new commanded fly height is commanded at step 314, and an adjustment is made to set the fly height at the commanded fly height level.

It will be appreciated that the various embodiments disclosed herein may provide a number of benefits. Verifying the clearance measurements using multiple mechanisms can reduce the instances of inadvertent head-disc contact. Evaluating confidence intervals can further ensure that a commanded reduction in fly height will not likely result in a contact event.

In some cases, different verification operations can be carried out under different operational conditions. For example, a baseline set of measurements can be carried out to verify the actual clearance regression data at an ambient operational temperature, such as around 20 degrees Celsius (° C.), and compensation values can be derived to account for changes in ambient temperature to elevated levels (such as 45° C., etc.). In other cases, different regression analyses can be carried out at different radii of the media so that a first regression data set is used for zones of tracks near an outermost diameter (OD) and a second regression data set can be used for zones of tracks near an innermost diameter (ID).

While various embodiments have been described in the environment of a hard disc drive, it will be appreciated that the disclosed subject matter is not so limited. Rather, any number of different types of clearance control systems can be configured in accordance with the present disclosure.

It is to be understood that even though numerous characteristics and advantages of various embodiments of the present disclosure have been set forth in the foregoing description, together with details of the structure and function of various embodiments disclosed, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
using a sensor to sense a plurality of patterns from an adjacent surface, each pattern written at a different constant frequency; and
setting a final clearance distance between the sensor and the surface in response to a multi-frequency response ratio from the sensor at the final clearance distance and a single frequency response ratio from the sensor at the final clearance distance.

2. The method of claim 1, wherein the multi-frequency response ratio is determined by sensing a first pattern written at a first frequency to provide a first sense signal, sensing a second pattern written at a different second frequency to provide a second sense signal, and determining an amplitude response ratio in relation to respective amplitudes of the first and second sense signals, wherein the first and second sense signals are both obtained while maintaining the sensor at a constant non-contacting clearance distance from the surface.

3. The method of claim 2, wherein the single frequency response ratio is determined by sensing a selected pattern at a selected frequency at a first non-contacting clearance distance from the surface to provide a third sense signal, sensing the selected pattern at the selected frequency at a different, second non-contacting clearance distance from the surface to provide a fourth sense signal, and determining an amplitude response ratio in relation to respective amplitudes of the third and fourth sense signals.

4. The method of claim 1, wherein the multi-frequency response ratio indicates an actual clearance distance between the sensor and the surface, and the single frequency response ratio indicates a relative clearance distance between the sensor and the surface.

5. The method of claim 1, wherein the final clearance distance is set by performing a first regression analysis for a plurality of multi-harmonic response ratio values from the sensor at different clearance distances to define an actual clearance regression curve, performing a second regression analysis for a plurality of single harmonic response ratio values from the sensor at different clearance distances to define a relative clearance regression curve, and comparing the relative clearance regression curve to the actual clearance regression curve.

6. The method of claim 5, further comprising comparing a slope of the relative clearance regression curve at a target clearance interval with a corresponding slope of the actual clearance regression curve at the target clearance interval to establish statistical similarity between the respective actual clearance and relative clearance regression curves.

7. The method of claim 5, further comprising determining a single sided confidence interval for the actual clearance regression curve at the target clearance interval and comparing a magnitude of the single sided confidence interval to a magnitude of the target clearance interval, wherein the actual clearance regression curve is used to set the final clearance distance responsive to the target clearance interval being less than the single sided confidence interval at the target clearance interval.

8. The method of claim 1, wherein the final clearance distance is set by using the single frequency response ratio to validate the multi-frequency response ratio, and by adjusting a power level applied to a heater adjacent the sensor responsive to the validated multi-frequency response ratio.

9. The method of claim 1, further comprising incrementally reducing the clearance distance between the sensor and the surface to a succession of values, measuring a harmonic response of the sensor at each value until contact is detected between the sensor and the surface, and performing a regression analysis to correlate heater power input value to clearance distance.

10. The method of claim 1, further comprising performing a first regression of a plurality of multi-harmonic ratio values to generate an actual clearance regression curve that describes actual clearance distance versus heater power input values, performing a second regression of a plurality of single harmonic ratio values to generate a relative clearance regression curve that describes relative clearance distance versus heater power input values, and comparing a slope of the actual clearance regression curve to a slope of the relative clearance regression curve at a target heater power input value, the second regression continuing with successively lower clearance distances until contact is detected with the surface.

11. An apparatus comprising:
a sensor positioned adjacent a surface with a plurality of oscillating patterns at different constant frequencies written thereto;
a clearance adjustment mechanism configured to change a clearance distance between the sensor and the surface; and
a processing circuit adapted to control a clearance distance between the sensor and the surface by performing a first regression of a plurality of multi-harmonic ratio values obtained as the sensor senses the plurality of oscillating patterns, performing a second regression of a plurality of single harmonic ratio values obtained as the sensor senses one of the plurality of oscillating patterns, and comparing a slope of the second regression to a slope of the first regression at a target clearance distance.

12. The apparatus of claim 11, wherein the processing circuit is further adapted to output a control value to a heater coupled to the sensor to adjust the clearance distance to a final clearance distance responsive to the respective slopes of the first and second regressions being within a selected threshold range.

13. The apparatus of claim 11, wherein the first regression provides actual clearance regression data stored in memory that describe actual clearance distance versus power input value, and the second regression provides relative clearance distance regression data stored in memory that describe a relative clearance distance versus power input value.

14. The apparatus of claim 11, wherein the clearance adjustment mechanism is a heater coupled to the sensor, and power input values to the heater induce thermal expansion of the heater to reduce the clearance distance between the sensor and the surface.

15. The apparatus of claim 11, wherein the processing circuit further operates to determine a single sided confidence interval for the first regression at the target clearance interval and to compare of the single sided confidence interval to a magnitude of the target clearance interval, wherein the actual clearance regression curve is used to set a final clearance distance responsive to the target clearance interval being less than the single sided confidence interval.

16. The apparatus of claim 11, wherein the processing circuit further performs a calibration routine by commanding an incremental reduction in the clearance distance between the sensor to a succession of clearance values and measuring a harmonic response of the sensor at each clearance value until contact is detected between the sensor and the surface, and performing a third regression upon the measured harmonic responses of the sensor to correlate a power input value to clearance distance.

17. The apparatus of claim 11, wherein the processing circuit compares the slope of the second regression to a slope of the first regression at the target clearance distance in an effort to verify the first regression accurately describes clearance distance in relation to power input values to the clearance adjustment mechanism, and wherein the processing circuit sets a flag in a memory location to identify an error condition associated with the sensor responsive to a difference between the slope of the second regression and the slope of the first regression.

18. An apparatus comprising:
a data recording medium;
a read/write transducer adjacent the data recording medium and comprising a data read sensor, a data writer and a heater; and
a processing circuit configured to direct the data writer to write a plurality of patterns to the medium with each pattern having a different constant frequency, to direct the read sensor to sense the plurality of patterns, to generate a multi-frequency response ratio value, a single frequency response ratio value from the sensed patterns and a single sided confidence interval at a selected confidence level with the transducer at a target clearance distance from the medium, and to output a power input value to the heater to adjust a clearance distance between the transducer and the medium responsive to the multi-frequency and single frequency response ratio values and responsive to the single sided confidence interval being less than the target clearance distance.

19. The apparatus of claim 18, wherein the processing circuit performs a first regression analysis upon a succession of multi-frequency response ratio values at a first set of clearance distances of the sensor, performs a second regression analysis upon a succession of single frequency response ratio values at a second set of clearance distances of the sensor, and compares the second regression analysis to the first regression analysis to verify an actual clearance distance between the transducer and the medium, the second set of clearance distances including a zero clearance distance.

20. The apparatus of claim 19, the processing circuit further operating to, responsive to the single sided confidence interval being greater than the target clearance distance, increasing the clearance distance to a second greater clearance distance nominally equal to the single sided confidence interval and generating a multi-frequency response ratio value and a single frequency response ratio value from the sensed patterns at the second greater clearance distance.

* * * * *